(12) United States Patent
Ehlig et al.

(10) Patent No.: US 12,601,487 B2
(45) Date of Patent: Apr. 14, 2026

(54) INJECTOR HEAD FOR FUEL INJECTOR

(71) Applicant: Solar Turbines Incorporated, San Diego, CA (US)

(72) Inventors: Ryan Ehlig, Santee, CA (US); Anthony Fahme, Chula Vista, CA (US); Stephen Paul Burke, Brantford (CA); Parker Erik Lappin, Lemon Grove, CA (US); Vu Minh Phi, Oceanside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 311 days.

(21) Appl. No.: 18/394,029

(22) Filed: Dec. 22, 2023

(65) Prior Publication Data

US 2025/0207779 A1      Jun. 26, 2025

(51) Int. Cl.
| | |
|---|---|
| *F23R 3/28* | (2006.01) |
| *B33Y 10/00* | (2015.01) |
| *B33Y 80/00* | (2015.01) |
| *F02C 7/22* | (2006.01) |

(52) U.S. Cl.
CPC .............. *F23R 3/283* (2013.01); *B33Y 10/00* (2014.12); *B33Y 80/00* (2014.12); *F02C 7/22* (2013.01); *F05D 2230/50* (2013.01); *F05D 2260/22141* (2013.01)

(58) Field of Classification Search
CPC . F23R 3/14; F23R 3/283; F23R 3/286; B33Y 10/00; B33Y 80/00; F02C 7/22; F05D 2230/50; F05D 2260/22141
See application file for complete search history.

(56) References Cited

U.S. PATENT DOCUMENTS

| | | |
|---|---|---|
| 8,336,313 B2 | 12/2012 | Mcmasters et al. |
| 9,310,081 B2 | 4/2016 | Thomson et al. |
| 11,753,994 B2 | 9/2023 | Binek et al. |
| | (Continued) | |

FOREIGN PATENT DOCUMENTS

| | | | | |
|---|---|---|---|---|
| DE | 102023123705 A1 * | 8/2024 | ......... | B23K 26/1476 |
| EP | 3141818 A1 | 3/2017 | | |

OTHER PUBLICATIONS

Gianni Panfili, Kevin Sheehan, Why Combustion Components are Particularly Suitable for Harvesting the Benefits of Additive Manufacturing, Turbomachinery & Pump Symposium, Sep. 14, 2020.

*Primary Examiner* — Steven M Sutherland

(57)      ABSTRACT

An injector head for a fuel injector of an engine includes an injector body configured to be coupled with a fuel stem of the fuel injector. The injector body extends orthogonally relative to the fuel stem. The injector body extends axially along a central axis and circumferentially about the central axis. The injector head also includes a central fuel assembly. The central fuel assembly includes a tip portion disposed proximal to a downstream end of the injector body. The tip portion includes an end portion, an intermediate portion, a plurality of support pins extending between the end portion and the intermediate portion, and a plurality of fins extending radially-outward and from the intermediate portion along the central axis. The injector head is formed by additive layer manufacturing. The plurality of support pins and the plurality of fins provide support for forming the injector head by additive layer manufacturing.

20 Claims, 6 Drawing Sheets

(56) References Cited

U.S. PATENT DOCUMENTS

| | | |
|---|---|---|
| 2009/0255256 A1 | 10/2009 | Mcmasters et al. |
| 2017/0059163 A1 | 3/2017 | Ott et al. |
| 2017/0146242 A1* | 5/2017 | Meadows .............. F02C 7/222 |
| 2021/0108800 A1 | 4/2021 | Rogers et al. |

* cited by examiner

*Section Y*

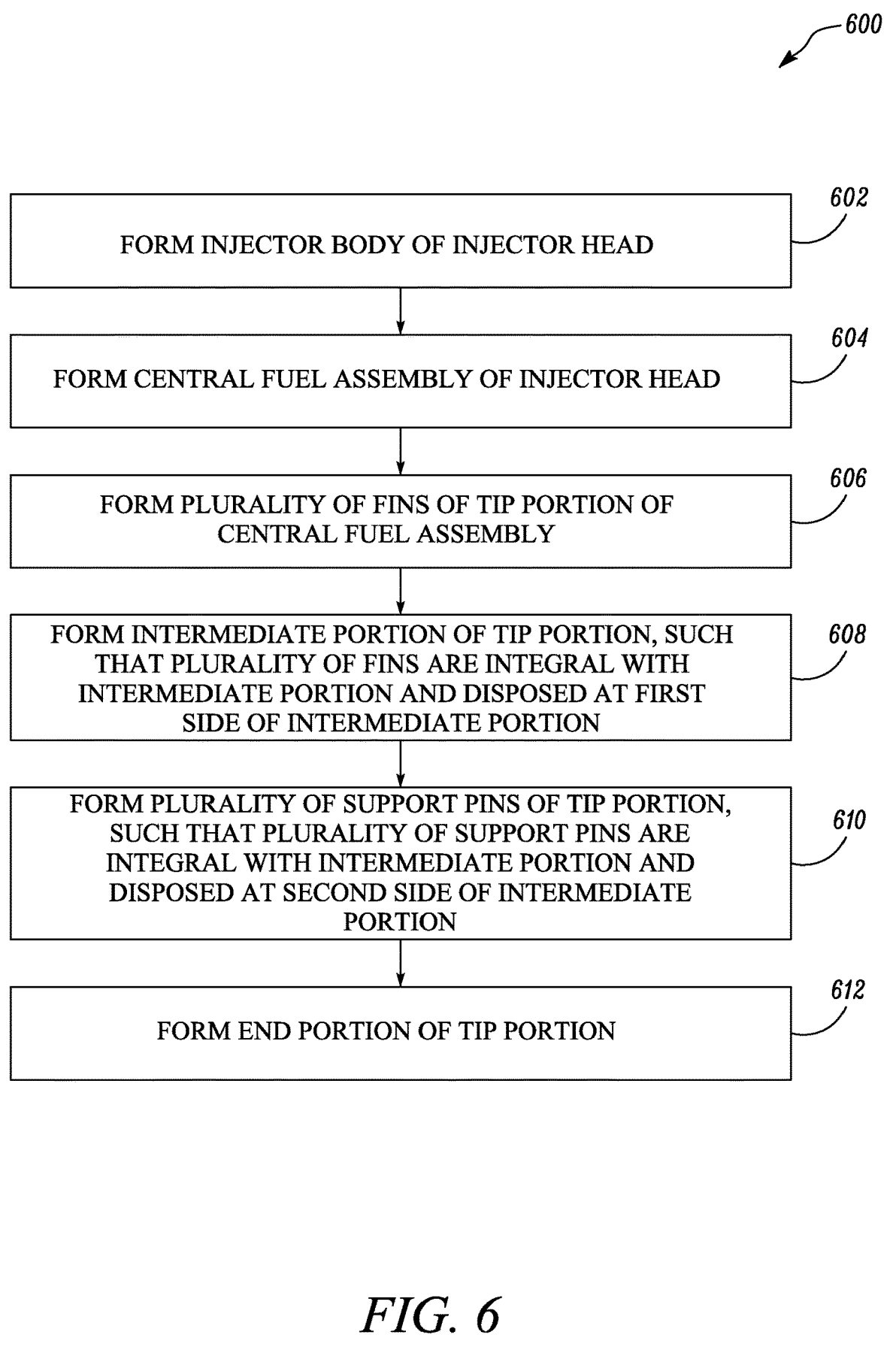

600

602

FORM INJECTOR BODY OF INJECTOR HEAD

604

FORM CENTRAL FUEL ASSEMBLY OF INJECTOR HEAD

606

FORM PLURALITY OF FINS OF TIP PORTION OF
CENTRAL FUEL ASSEMBLY

608

FORM INTERMEDIATE PORTION OF TIP PORTION, SUCH
THAT PLURALITY OF FINS ARE INTEGRAL WITH
INTERMEDIATE PORTION AND DISPOSED AT FIRST
SIDE OF INTERMEDIATE PORTION

610

FORM PLURALITY OF SUPPORT PINS OF TIP PORTION,
SUCH THAT PLURALITY OF SUPPORT PINS ARE
INTEGRAL WITH INTERMEDIATE PORTION AND
DISPOSED AT SECOND SIDE OF INTERMEDIATE
PORTION

612

FORM END PORTION OF TIP PORTION

*FIG. 6*

INJECTOR HEAD FOR FUEL INJECTOR

TECHNICAL FIELD

The present disclosure relates to an injector head for a fuel injector of an engine and a method of manufacturing the injector head for the fuel injector of the engine by additive layer manufacturing.

BACKGROUND

An engine, such as a gas turbine engine, includes a fuel injector to direct fuel and/or a mixture of air and fuel into a combustor of the engine under high temperature and pressure conditions. Conventionally, the fuel injector includes an injector head and a fuel stem. Further, one or more subcomponents or subassemblies of the fuel injector are coupled to each other via a number of brazed or welded joints. For example, the injector head may include one or more brazed joints or welded joints to couple the subassemblies together.

However, failure of one or more of the brazed joints may result in internal leakages within the injector head and may negatively impact a combustion performance of the engine. Further, the brazed joints may be difficult and costly to repair. The repairing and maintenance of the brazed joints may lead to expensive non-recurring tooling costs, may discourage design improvements of the fuel injector, and may increase operating costs of the engine. Further, brazed joints may increase complexity in manufacturing the injector head as well as an overall weight of the fuel injector.

Furthermore, the subassemblies of the injector head may be manufactured at different locations and then assembled together, which may increase an overall cost of the fuel injector and may also require longer lead times to manufacture the fuel injector.

U.S. Pat. No. 9,310,081 describes a method of fabricating a fuel injector which includes the steps of forming a structural portion of a fuel injector from an alloy having a first mechanical property, and then adding an alloy having a second mechanical property on a surface area of the structural portion to enhance the mechanical properties of the fuel injector.

SUMMARY OF THE DISCLOSURE

In an aspect of the present disclosure, an injector head for a fuel injector of an engine is provided. The fuel injector includes a fuel stem. The injector head includes an injector body configured to be coupled with the fuel stem and extending orthogonally relative to the fuel stem. The injector body extends axially along a central axis and circumferentially about the central axis. The injector body defines an upstream end and a downstream end. The injector head also includes a central fuel assembly extending circumferentially about the central axis and concentrically disposed within the injector body. The central fuel assembly includes a tip portion disposed proximal to the downstream end of the injector body. The tip portion includes an end portion defining a fuel opening. The tip portion also includes an intermediate portion axially spaced apart from the end portion along the central axis. The tip portion further includes a plurality of support pins extending between the end portion and the intermediate portion. The tip portion includes a plurality of fins extending radially-outward and from the intermediate portion along the central axis towards the upstream end of the injector body. The injector head is formed by additive layer manufacturing. The plurality of support pins and the plurality of fins provide support for forming the injector head by additive layer manufacturing.

In another aspect of the present disclosure, a method of manufacturing an injector head for a fuel injector of an engine is provided. The method includes forming an injector body of the injector head. The injector body extends axially along a central axis and orthogonally about the central axis. The injector body defines an upstream end and a downstream end. The method also includes forming a central fuel assembly of the injector head. The central fuel assembly extends circumferentially about the central axis and is concentrically disposed within the injector body. The method further includes forming a plurality of fins of a tip portion of the central fuel assembly. The tip portion is disposed proximal to the downstream end of the injector body. The method includes forming an intermediate portion of the tip portion, such that the plurality of fins are integral with the intermediate portion and disposed at a first side of the intermediate portion. The method also includes forming a plurality of support pins of the tip portion, such that the plurality of support pins are integral with the intermediate portion and disposed at a second side of the intermediate portion. The second side of the intermediate portion is opposite the first side of the intermediate portion. The method further includes forming an end portion of the tip portion. The end portion defines a fuel opening. The end portion is axially spaced apart from the intermediate portion along the central axis. The plurality of support pins extends between the end portion and the intermediate portion.

Other features and aspects of this disclosure will be apparent from the following description and the accompanying drawings.

BRIEF DESCRIPTION OF THE DRAWINGS

FIG. 6 is a flowchart for a method of manufacturing the fuel injector for the engine of FIG. 1 by additive layer manufacturing, according to an example of the present disclosure.

DETAILED DESCRIPTION

Wherever possible, the same reference numbers will be used throughout the drawings to refer to the same or like parts.

Figure 1:
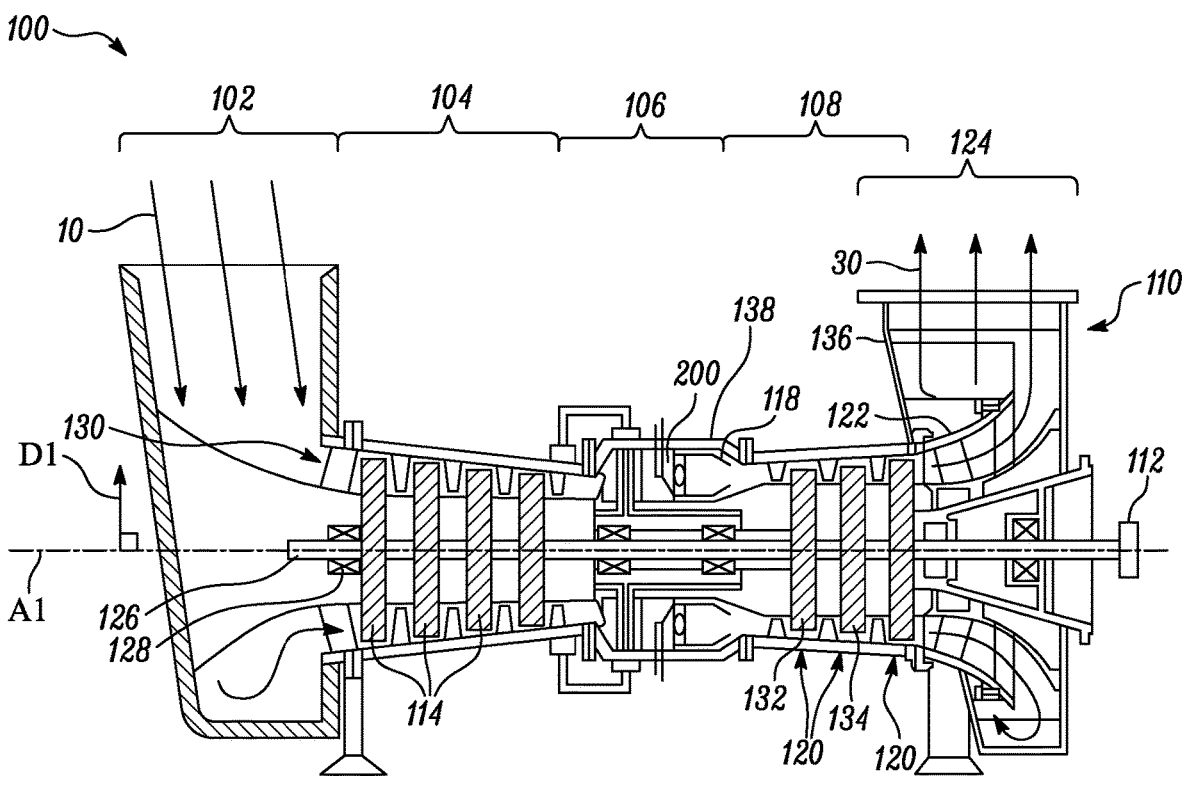
FIG. 1 is a schematic cross-sectional view of an exemplary engine.

FIG. 1 is a schematic cross-sectional view of an exemplary engine 100. The engine 100 is embodied as a gas turbine engine herein. The engine 100 will be hereinafter interchangeably referred to as "gas turbine engine 100". Alternatively, the engine 100 may include any other type of engine, such as, an internal combustion engine, without limiting the scope of the present disclosure. Some of the surfaces of the engine 100 have been left out or exaggerated for clarity and ease of explanation. Also, the disclosure may reference a forward and an aft direction. Generally, all references to "forward" and "aft" are associated with a flow direction of primary air (i.e., air used in combustion process), unless specified otherwise. For example, forward is "upstream" relative to primary air flow, and aft is "downstream" relative to primary air flow.

In addition, the disclosure may generally reference a longitudinal axis "A1" of rotation of the engine 100. The longitudinal axis "A1" may be common to or shared with various other engine concentric components. All references to radial, axial, and circumferential directions and measures refer to the longitudinal axis "A1", unless specified otherwise, and terms such as "inner" and "outer" generally indicate a lesser or greater radial distance from, wherein a radial direction "D1" may be in any direction perpendicular and radiating outward from the longitudinal axis "A1".

The engine 100 includes an inlet 102, a compressor 104, a combustor 106, a turbine 108, an exhaust system 110, and a power output coupling 112. The compressor 104 includes one or more compressor rotor assemblies 114. The combustor 106 includes one or more fuel injectors 200 and one or more combustion chambers 118. Specifically, the one or more fuel injectors 200 are disposed in the gas turbine engine 100. The turbine 108 includes one or more turbine rotor assemblies 120. The exhaust system 110 includes an exhaust diffuser 122. Further, the exhaust system 110 includes an engine exhaust 124 defining an exhaust interface 136. The engine 100 also includes a shaft 126 supported by a number of bearing assemblies 128 (only one such bearing assembly is labeled). The shaft 126 extends along the longitudinal axis "A1".

As illustrated in FIG. 1, the compressor rotor assemblies 114 and the turbine rotor assemblies 120 are axial flow rotor assemblies. Each turbine rotor assembly 120 includes a rotor disk (not shown) that is circumferentially populated with corresponding turbine blades (not shown). Further, each compressor rotor assembly 114 may also include a rotor disk (not shown) that is circumferentially populated with corresponding compressor blades (not shown).

A gas (typically air 10) enters the inlet 102 as a "working fluid" and is compressed by the compressor 104. In the compressor 104, the working fluid is compressed in an annular flow path 130 by the series of compressor rotor assemblies 114. In particular, the air 10 is compressed in numbered "stages", the stages being associated with each compressor rotor assembly 114. For example, "2$^{nd}$ stage air" may be associated with the 2$^{nd}$ compressor rotor assembly 114. Likewise, each turbine rotor assembly 120 may be associated with a numbered stage. For example, a first stage turbine rotor assembly 132 is the forward most of the turbine rotor assemblies 120, a second stage rotor assembly 134 is located downstream of the first stage turbine rotor assembly 132, and so on. However, other numbering/naming conventions may also be used.

The compressed air 10 leaving the compressor 104 enters the combustor 106, where the compressed air 10 is diffused and fuel is added. The air 10 and the fuel are injected into the combustion chamber 118 via the one or more fuel injectors 200 for ignition. After the combustion reaction, energy is extracted from the combusted fuel/air mixture via the turbine 108 by each stage of the series of turbine rotor assemblies 120. Exhaust gases 30 may then be diffused in the exhaust diffuser 122. Further, the exhaust gases 30 may exit the engine 100 via the exhaust interface 136.

In some examples, an exhaust gas treatment system (not shown) may be disposed in fluid communication with the engine exhaust 124 to receive the exhaust gases 30 therefrom. The exhaust gas treatment system may include, for example, a waste heat recovery system, a selective catalytic reduction (SCR) module (not shown), a carbon capture system, and the like. For example, the exhaust gases 30 may be processed for e.g., to reduce harmful emissions/products present therein in the SCR module or the carbon capture system. Further, the exhaust gases 30 may be processed to recover heat from the exhaust gases 30 in the waste heat recovery system. The waste heat recovery system may recover waste heat from the exhaust gases 30 and may use the recovered waste heat for various applications, such as, in cogeneration applications where the waste heat may be used to boil water to run through a steam turbine (not shown).

Figure 2:
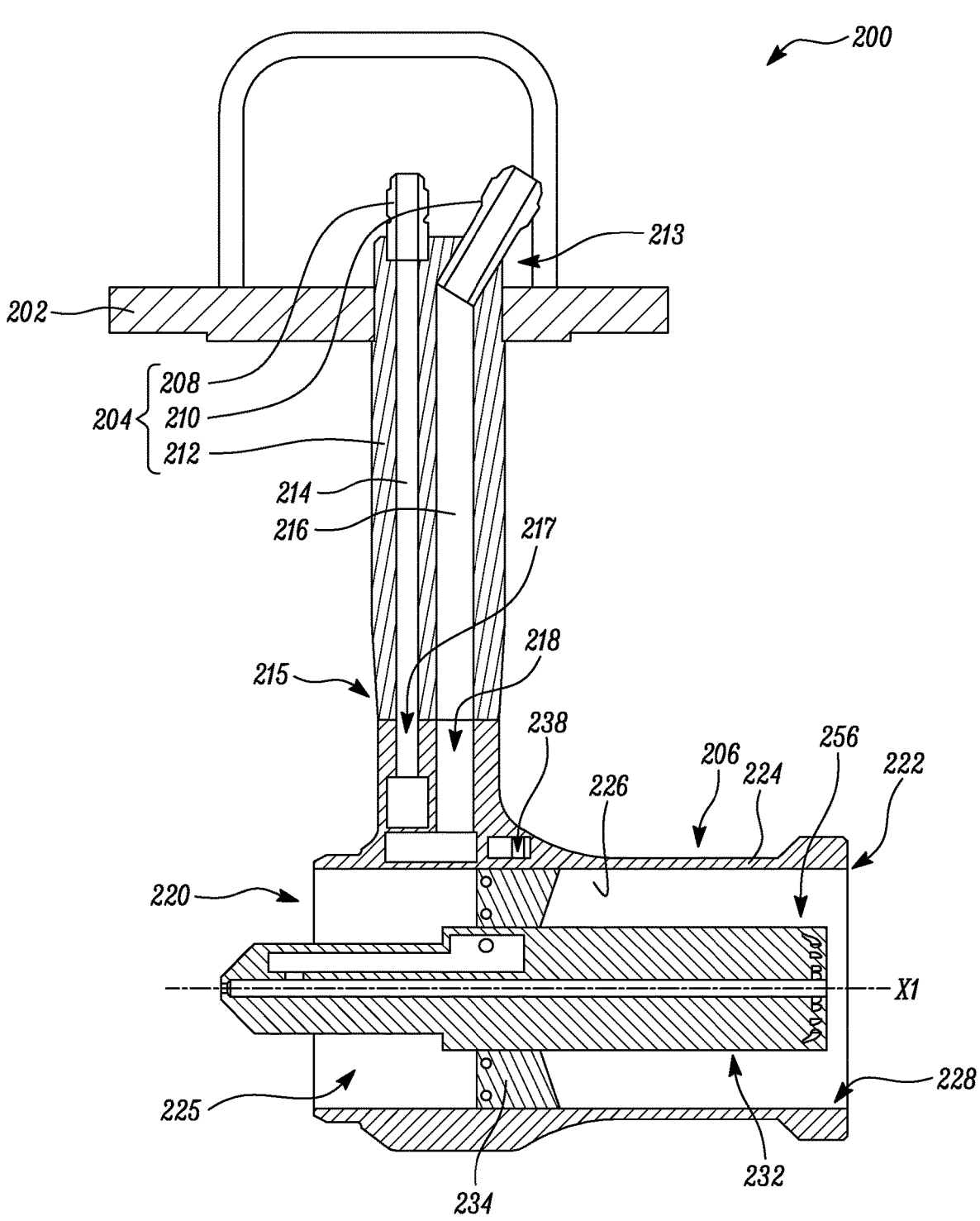
FIG. 2 is a schematic cross-sectional view of a fuel injector for the engine of FIG. 1, according to an example of the present disclosure.

FIG. 2 is a schematic cross-sectional view of the fuel injector 200 for the engine 100 of FIG. 1. The fuel injector 200 includes a flange 202, a fuel stem assembly 204, and an injector head 206. The view illustrated in FIG. 2 has been simplified to only illustrate components of interest. The flange 202 may be a cylindrical disk and may include mounting holes (not shown) for fastening the fuel injector 200 to a combustor case 138 (see FIG. 1).

The fuel stem assembly 204 includes a pilot fitting 208 and a main fitting 210. The fuel injector 200 also includes a fuel stem 212. Specifically, the fuel stem assembly 204 includes the fuel stem 212. The fuel stem 212 defines a first end 213 and a second end 215 opposite the first end 213. The pilot fitting 208 is coupled to the fuel stem 212 at the first end 213. The pilot fitting 208 may receive fuel from a pilot fuel source (not shown). In some examples, the pilot fuel may include a gaseous fuel. In other examples, the pilot fuel may include a liquid fuel. In some examples, the pilot fuel may include diesel, kerosene, and the like. In other examples, the pilot fuel may include natural gas, hydrogen, refinery gas, syn gas, and the like.

Further, the main fitting 210 is coupled to the fuel stem 212 at the first end 213. The main fitting 210 may receive fuel from a main fuel source (not shown). In some examples, the main fuel may include a gaseous fuel. In other examples, the main fuel may include a liquid fuel. In some examples, the main fuel may include diesel, kerosene, and the like. In other examples, the main fuel may include natural gas, hydrogen, refinery gas, syn gas, and the like. In some examples, the pilot fuel and the main fuel may be received from the same fuel source. The pilot fuel and the main fuel will be hereinafter interchangeably referred to as "fuel".

The fuel stem 212 defines a pilot conduit 214 and a main conduit 216. The pilot conduit 214 receives the pilot fuel from the pilot fuel source and allows the fuel to flow towards the injector head 206. The main conduit 216 receives the main fuel from the main fuel source and allows the fuel to flow towards the injector head 206.

Figure 3:
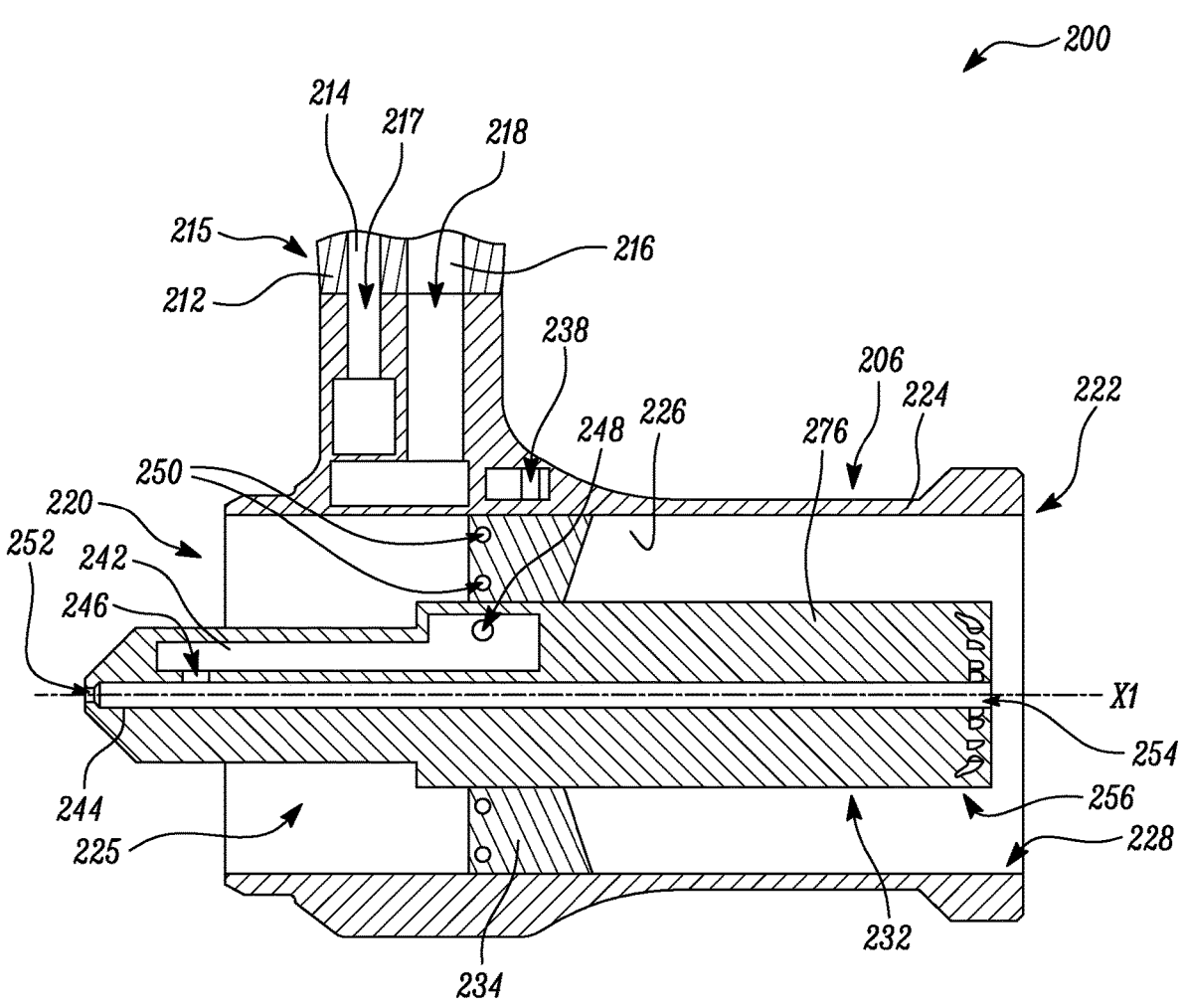
FIG. 3 is a cross-sectional view of a portion of the fuel injector of FIG. 2.

FIG. 3 is a cross-sectional view of a portion of the fuel injector 200 of FIG. 2. As shown in FIG. 3, the injector head 206 includes an injector body 224. The injector body 224 is coupled with the fuel stem 212. Specifically, the fuel stem 212 is coupled with the injector body 224 at the second end 215. In some examples, the injector body 224 may be coupled with the fuel stem 212 via a brazed joint. Alternatively, the injector body 224 may be coupled with the fuel stem 212 via any other process, such as welding, without limiting the scope of the present disclosure. In some cases, the fuel stem 212 may be formed by a machining process. In other cases, the fuel stem 212 may be formed by additive layer manufacturing or any other process. Although the fuel stem 212 is formed separately from the injector head 206, it may be contemplated to form the fuel stem 212 integrally with the injector head 206.

The injector body 224 extends orthogonally relative to the fuel stem 212. The injector body 224 extends axially along a central axis "X1" and circumferentially about the central axis "X1". The injector body 224 defines an upstream end 220 and a downstream end 222. The compressed air 10 (see FIG. 1) may enter the injector body 224 via the upstream end 220. The injector body 224 also defines an opening 217 and an opening 218. The opening 217 is in fluid communication with the pilot conduit 214 and the opening 218 is in fluid communication with the main conduit 216.

The injector head 206 is formed by additive layer manufacturing. In some examples, the additive layer manufacturing may include a binder jetting process, a directed energy deposition process, a material extrusion process, a powder bed fusion process, a fused layer modeling process, and the like.

In some examples, the injector head 206 includes one or more parent materials for forming the injector head 206 by additive layer manufacturing. For example, the injector head 206 may include a single parent material or two parent materials for forming the injector head 206 by additive layer manufacturing. In some examples, the one or more parent material may include Hastelloy X powder. In other examples, the one or more parent materials may include a metallic material, a ceramic material, a polymeric material, or combination thereof. In some examples, the one or more patent materials may include stainless steel, a cobalt-based alloy, a nickel-based alloy, and the like. It should be noted that the present disclosure is not limited by a type of additive layer manufacturing, or a material used for forming the injector head 206.

Further, after the injector head 206 is formed by additive layer manufacturing, the opening 217 and the opening 218 may allow any residual powder/excess powder present in the injector body 224 to be discarded from the injector head 206 before coupling the fuel stem 212 with the injector head 206.

Furthermore, after the injector head 206 is formed by additive layer manufacturing, the injector head 206 may be further subjected to one or more post additive layer manufacturing processes. For example, the injector head 206 may be subjected to a heat treatment process.

The injector body 224 includes a wall 226. The wall 226 defines an inner surface of the injector body 224. Specifically, the wall 226 of the injector body 224 circumferentially extends around the central axis "X1" and also axially extends along the central axis "X1". The injector body 224 defines a premix passage 225 axially extending along the central axis "X1". In other words, the premix passage 225 extends between the upstream end 220 and the downstream end 222 of the injector body 224. The injector body 224 defines an opening 228 at the downstream end 222.

The injector head 206 also includes a central fuel assembly 232. The central fuel assembly 232 extends circumferentially about the central axis "X1" and is concentrically disposed within the injector body 224.

Figure 4:
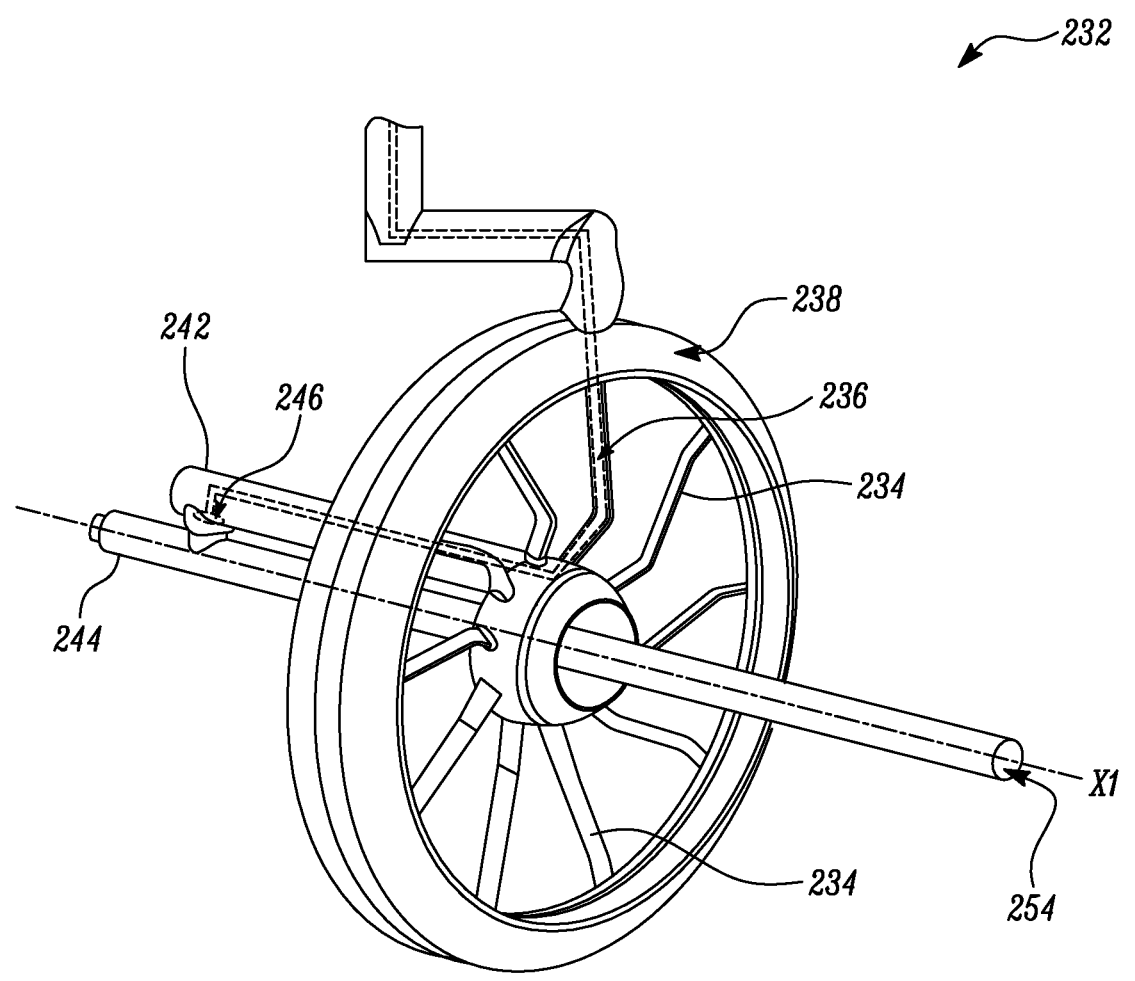
FIG. 4 is a schematic perspective view of an inverse volume of a portion of an injector head of the fuel injector of FIG. 2, for clarity, only certain structures have been depicted.

Referring to FIGS. 3 and 4, the injector body 224 includes a number of swirler vanes 234 radially extending between the injector body 224 and the central fuel assembly 232. Each of the number of swirler vanes 234 defines a passage 236 therein. It should be noted that the injector body 224 may include any number of swirler vanes 234 based on application attributes. Each of the number of swirler vanes 234 defines a number of holes 250 (only some of which are shown in FIG. 3).

Each of the number of the swirler vanes 234 also includes an opening 248. The opening 248 is in fluid communication with the passage 236 of a corresponding swirler vane 234 and with the central fuel assembly 232.

The injector body 224 also includes an annular fuel gallery 238 formed in the wall 226 of the injector body 224. The annular fuel gallery 238 circumferentially extends around the central axis "X1". The annular fuel gallery 238 is in fluid communication with the fuel stem 212 via the second end 215. In other words, the annular fuel gallery 238 is defined between the second end 215 of the fuel stem 212 and the wall 226 of the injector body 224. The annular fuel gallery 238 is disposed in fluid communication with the passage 236 of each of the number of swirler vanes 234. The annular fuel gallery 238 receives the main fuel from the main conduit 216 and/or the pilot fuel from the pilot conduit 214 and allows the main fuel and/or the pilot fuel to flow towards the swirler vanes 234.

With reference to FIG. 3, the main fuel may exit the swirler vanes 234 from the holes 250. The main fuel may then enter the premix passage 225 and may mix with the compressed air 10 (see FIG. 1) therein. The air and fuel mixture may then exit the premix passage 225 through the opening 228 of the injector body 224 and may be directed towards the combustion chamber 118 (see FIG. 1) to be combusted within the combustion chamber 118.

The central fuel assembly 232 includes a plenum 242. The plenum 242 extends along the central axis "X1" and is disposed in fluid communication with the passage 236 (see FIG. 4) of each of the number of swirler vanes 234. Particularly, the plenum 242 is in fluid communication with the passage 236 of each of the number of swirler vanes 234 via the openings 248.

The central fuel assembly 232 also includes a pilot tube 244. The pilot tube 244 extends along the central axis "X1" and that is in fluid communication with the plenum 242. Particularly, the central fuel assembly 232 includes an opening 246 that fluidly couples the plenum 242 and the pilot tube 244. The pilot tube 244 defines a first opening 252 disposed proximal to the upstream end 220 of the injector body 224 and a second opening 254 disposed proximal to the downstream end 222 of the injector body 224.

The first opening 252 allows the compressed air 10 to enter the pilot tube 244. Further, the first opening 252 facilitates removal of residual powder from at least a portion of the central fuel assembly 232. Specifically, after the injector head 206 is formed by additive layer manufacturing, any residual powder present in the plenum 242 or the pilot tube 244 may be removed therefrom, via the first opening 252. Further, the second opening 254 is in fluid communication with a fuel opening 260 (see FIG. 5A) of an end portion 258 (see FIG. 5A). The end portion 258 and the fuel opening 260 will be described below in detail.

It should be noted that, the pilot fuel entering the passage 236 (see FIG. 4) of each of the number of swirler vanes 234, may exit the swirler vanes 234 via the opening 248. The opening 248 allows the pilot fuel to flow towards and into the plenum 242 of the central fuel assembly 232. The pilot fuel may be then directed towards the pilot tube 244 from the plenum 242 via the opening 246. The pilot fuel in the pilot tube 244 may mix with the compressed air 10 therein. The air and fuel mixture may then exit the pilot tube 244 from the second opening 254 and may be fed towards the combustion chamber 118 to be combusted within the combustion chamber 118.

The central fuel assembly 232 further includes a central body 276 concentrically disposed between the injector body 224 and the pilot tube 244. The central fuel assembly 232 includes a tip portion 256 disposed proximal to the downstream end 222 of the injector body 224.

Figure 5A:
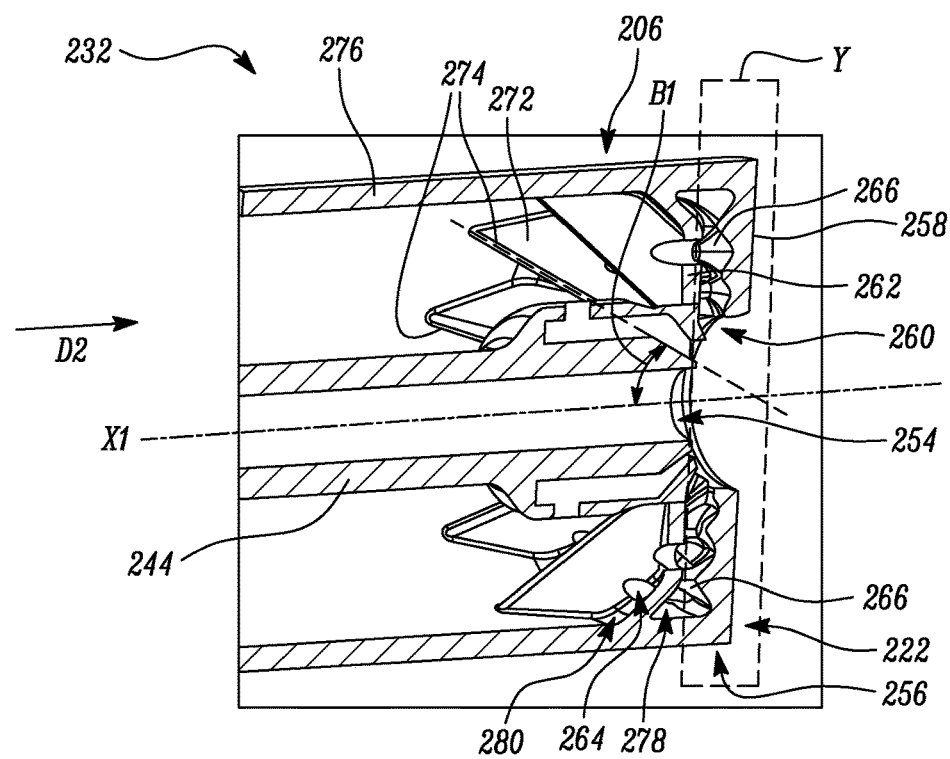
FIG. 5A is a schematic cross-sectional view of a portion of a central fuel assembly of the fuel injector of FIG. 2.

Referring to FIG. 5A, a schematic cross-sectional view of the tip portion 256 is illustrated. The tip portion 256 includes the end portion 258 defining the fuel opening 260. The tip portion 256 also includes an intermediate portion 262 axially spaced apart from the end portion 258 along the central axis "X1". The intermediate portion 262 and at least some of a number of fins 272 define a number of cooling holes 264. The cooling holes 264 may receive airflow therein to facilitate cooling of the central fuel assembly 232. It should be noted that each of the end portion 258 and the intermediate portion 262 circumferentially extend about the central axis "X1". The intermediate portion 262 also defines a first side 278 and a second side 280 opposite the first side 278.

The tip portion 256 further includes a number of support pins 266. The support pins 266 extend between the end portion 258 and the intermediate portion 262.

Figure 5B:
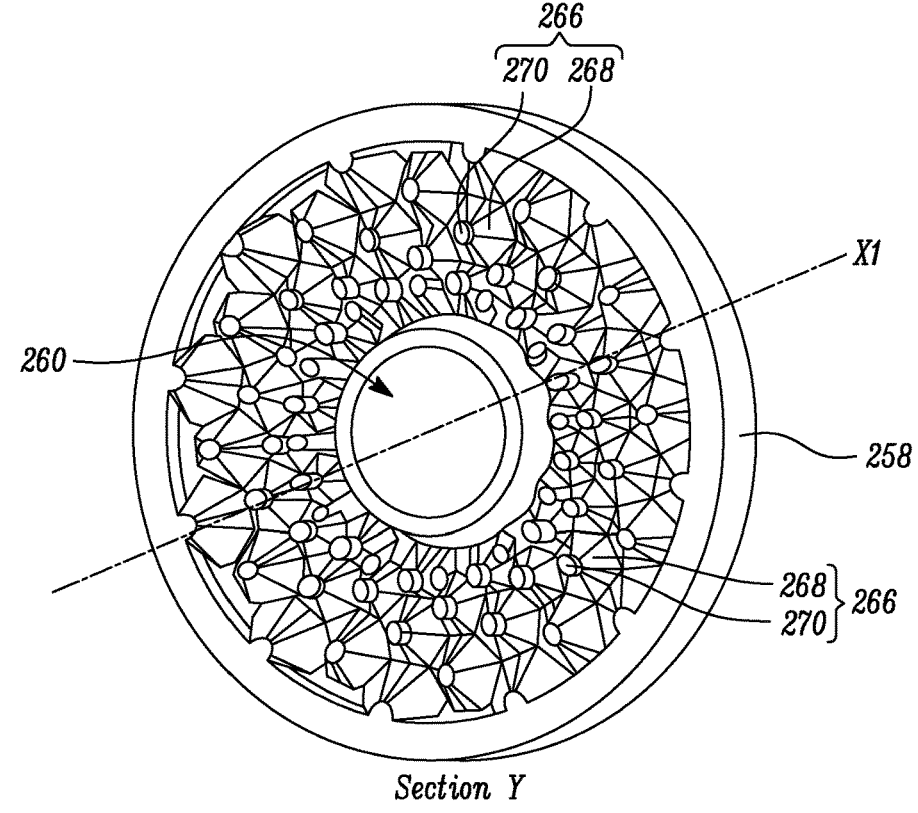
FIG. 5B is a schematic perspective view illustrating a portion of the central fuel assembly of FIG. 5A.

Referring to FIG. 5B, an enlarged schematic perspective view of a section Y of the central fuel assembly 232 of FIG. 5A is illustrated. Each of the number of support pins 266 includes a first portion 268. A cross-section of the first portion 268 of each of the number of support pins 266 tapers (narrows) towards the upstream end 220 (see FIG. 3) of the injector body 224 (see FIG. 3) along the central axis "X1" from the end portion 258 towards the intermediate portion 262 (see FIG. 5A). The first portion 268 is integral with the end portion 258. In the illustrated example of FIG. 5B, the first portion 268 has a shape of a truncated cone. Alternatively, the first portion 268 may have any other shape based on application attributes. Further, a length of the first portion 268 along the central axis "X1" may be same for some of the support pins 266. Furthermore, the length of the first portion 268 along the central axis "X1" may be different for some of the support pins 266.

Further, each of the number of support pins 266 includes a second portion 270. The second portion 270 includes a uniform cross-section. In the illustrated example of FIG. 5B, the second portion 270 of each of the number of support pins 266 includes a cylindrical shape. Alternatively, the second portion 270 may have any other shape based on application attributes. The second portion 270 extends upstream from the first portion 268 towards the intermediate portion 262. Further, a length of the second portion 270 along the central axis "X1" may be same for some of the support pins 266. Furthermore, the length of the second portion 270 along the central axis "X1" may be different for some of the support pins 266.

Further, at least some of the number of support pins 266 may have different sizes. For example, the first portion 268 and the second portion 270 of one or more support pins 266 may have a different size than the first portion 268 and the second portion 270 of one or more other support pins 266. The term "size" as used herein may relate to an average diameter of the first portion 268 and a uniform diameter of the second portion 270.

Furthermore, at least some of the number of support pins 266 may have the same size. For example, the first portion 268 and the second portion 270 of one or more support pins 266 may have the same size as that of the first portion 268 and the second portion 270 of one or more other support pins 266. It should be noted that a shape of the support pins 266 as described herein is exemplary in nature, and the support pins 266 may include any other shape that may facilitate printing of the tip portion 256.

Referring again to FIG. 5A, the tip portion 256 includes the number of fins 272. The number of fins 272 extend radially-outward and from the intermediate portion 262 along the central axis "X1" towards the upstream end 220 (see FIG. 3) of the injector body 224 (see FIG. 3). Particularly, the number of fins 272 extend radially-outward from the pilot tube 244 towards the central body 276. Further, a leading edge 274 of each of the number of fins 272 extends between the central body 276 and the pilot tube 244 at an angle B1 between 35 degrees and 50 degrees relative to the central axis "X1". In an example, the angle B1 may be approximately equal to 45 degrees.

Further, the number of support pins 266 and the number of fins 272 provide support for forming the injector head 206 by additive layer manufacturing. Specifically, during the additive layer manufacturing of the injector head 206, the injector head 206 is formed along a direction "D2". Accordingly, during the additive layer manufacturing, the fins 272 may provide support to the injector head 206 to form the intermediate portion 262 and a portion of the pilot tube 244 proximal to the downstream end 222 of the injector body 224. Moreover, the support pins 266 may provide support to the injector head 206 to form the end portion 258.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure describes the injector head 206 formed by the additive layer manufacturing. The injector head 206 includes an integrated design herein without any brazed joints or welded joints. Specifically, the injector head 206 is formed as a single-piece component, without requiring any brazed joints or welded joints. Usage of additive layer manufacturing technology to form the injector head 206 may allow printing of complex geometrical design of the injector head 206 at a single location, which may reduce lead times to manufacture the injector head 206 and may allow improvements in design of the injector head 206.

The central fuel assembly 232 of the injector head 206 includes the tip portion 256. The tip portion 256 includes the end portion 258 and the intermediate portion 262. The tip portion 256 includes the number of support pins 266 extending between the end portion 258 and the intermediate portion 262. The number of support pins 266 may provide support to form the injector head 206 via additive layer manufacturing.

The tip portion 256 further includes the number of fins 272. The fins 272 may improve printability of the tip portion 256 by additive layer manufacturing. Further, the intermediate portion 262 and some of the fins 272 define the multiple cooling holes 264. The cooling holes 264 may allow passage of air therethrough to facilitate cooling of one or more components of the injector head 206 and may also maintain a temperature of the mixture of air and fuel within desired limits.

While forming the injector head 206 by additive layer manufacturing, residual powder may get accumulated in channels and cavities of the injector head 206 that is required to be removed from the injector head 206. For example, the residual powder may get accumulated in at least a portion of the central fuel assembly 232 such as, the plenum 242, and/or the annular fuel gallery 238. The first opening 252 of the pilot tube 244 may allow drainage or removal of the residual powder located in the portion of the central fuel assembly 232. In some examples, the first opening 252 of the pilot tube 244 may have a funnel shaped profile to allow the excess powder to be drain out from the plenum 242 and/or the pilot tube 244. Further, the openings 217, 218 may allow the residual powder to drain out from the injector head 206, before coupling the fuel stem 212 with the injector head 206.

Forming of the injector head 206 by additive layer manufacturing may eliminate brazed joints, which may in turn improve a performance of the fuel injector 200. The injector head 206 of the present disclosure may be cost-effective to manufacture as compared to conventional injector heads. Further, as the injector head 206 does not require brazing, the injector head 206 of the present disclosure may require less time for manufacturing and may be lighter in weight as compared to conventional injector heads. Furthermore, due to the absence of brazed joints, any leakages within the injector head 206 may be prevented. Moreover, the servicing and maintenance costs associated with the injector head 206 may be reduced as tooling costs required to repair the brazed joints may be reduced.

Moreover, the injector head 206 described herein may be simple in construction, may have universal applicability in engines of different designs, and may be retrofitted in existing engines.

FIG. 6 illustrates a flowchart for a method 600 of manufacturing the injector head 206 for the fuel injector 200 of the engine 100 by additive layer manufacturing. Referring to FIGS. 1 to 6, at step 602, the injector body 224 of the injector head 206 of the fuel injector 200 is formed. The injector body 224 extends axially along the central axis "X1" and circumferentially about the central axis "X1". The injector body 224 defines the upstream end 220 and the downstream end 222. The step 602 also includes forming the number of swirler vanes 234 of the injector body 224. The number of swirler vanes 234 radially extend between the injector body 224 and the central fuel assembly 232. Each of the number of swirler vanes 234 define the passage 236 therein. The step 602 further includes forming the annular fuel gallery 238 in the wall 226 of the injector body 224. The annular fuel gallery 238 is disposed in fluid communication with the passage 236 of each of the number of swirler vanes 234.

At step 604, the central fuel assembly 232 of the injector head 206 is formed. The central fuel assembly 232 extends circumferentially about the central axis "X1" and is concentrically disposed within the injector body 224. The step 604 also includes forming the plenum 242 extending along the central axis "X1" and disposed in fluid communication with the passage 236 of each of the number of swirler vanes 234. The step 604 further includes forming the pilot tube 244 extending along the central axis "X1" and that is in fluid communication with the plenum 242. The pilot tube 244 defines the first opening 252 disposed proximal to the upstream end 220 of the injector body 224 and the second opening 254 disposed proximal to the downstream end 222 of the injector body 224. The second opening 254 is in fluid communication with the fuel opening 260 of the end portion 258. The method 600 further includes removing, via the first opening 252, the residual powder after forming the injector head 206. The central fuel assembly 232 further includes the central body 276 concentrically disposed between the injector body 224 and the pilot tube 244.

At step 606, the number of fins 272 of the tip portion 256 of the central fuel assembly 232 is formed. Each of the number of fins 272 are formed such that the leading edge 274 of each of the number of fins 272 extends between the central body 276 and the pilot tube 244 at the angle between 35 degrees and 50 degrees relative to the central axis "X1". The tip portion 256 is disposed proximal to the downstream end 222 of the injector body 224.

At step 608, the intermediate portion 262 of the tip portion 256 is formed, such that the number of fins 272 are integral with the intermediate portion 262 and disposed at the first side 278 of the intermediate portion 262. The step 608 further includes defining the number of cooling holes 264 in the intermediate portion 262 and at least some of the number of fins 272.

At step 610, the number of support pins 266 of the tip portion 256 is formed, such that the number of support pins 266 are integral with the intermediate portion 262 and disposed at the second side 280 of the intermediate portion 262. The second side 280 of the intermediate portion 262 is opposite the first side 278 of the intermediate portion 262. The step 610 also includes forming the first portion 268 of the each of the number of support pins 266. The cross-section of the first portion 268 of each of the number of support pins 266 tapers along the central axis "X1" from the end portion 258 towards the intermediate portion 262. The first portion 268 is integral with the end portion 258. The step 610 further includes forming the second portion 270 of at least some of the number of support pins 266. The second portion 270 includes the uniform cross-section. The second portion 270 extends from the first portion 268 towards the intermediate portion 262.

At step 612, the end portion 258 of the tip portion 256 is formed. The end portion 258 defines the fuel opening 260. The end portion 258 is axially spaced apart from the intermediate portion 262 along the central axis "X1". The number of support pins 266 extend between the end portion 258 and the intermediate portion 262.

It may be desirable to perform one or more of the steps shown in FIG. 6, and/or described above, in an order different from that depicted and/or described. One or more of the steps shown in FIG. 6, and/or described above, could be omitted. Furthermore, various steps could be performed together.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings. Proportions and scale may vary between the drawings.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. An injector head for a fuel injector of an engine, the fuel injector including a fuel stem, the injector head comprising:

an injector body configured to be coupled with the fuel stem and extending orthogonally relative to the fuel stem, the injector body extending axially along a central axis and circumferentially about the central axis, the injector body defining an upstream end and a downstream end;

a central fuel assembly extending circumferentially about the central axis and concentrically disposed within the injector body, the central fuel assembly including a tip portion disposed proximal to the downstream end of the injector body, wherein the tip portion includes:

an end portion defining a fuel opening;

an intermediate portion axially spaced apart from the end portion along the central axis;

a plurality of support pins extending between the end portion and the intermediate portion; and a plurality of fins extending radially-outward and from the intermediate portion along the central axis towards the upstream end of the injector body, wherein the injector head is formed by additive layer manufacturing, and wherein the plurality of support pins and the plurality of fins provide support for forming the injector head by additive layer manufacturing.

2. The injector head of claim 1, wherein the intermediate portion and at least some of the plurality of fins defines a plurality of cooling holes.

3. The injector head of claim 1, wherein each of the plurality of support pins includes a first portion, wherein a cross-section of the first portion of each of the plurality of support pins tapers along the central axis from the end portion towards the intermediate portion, and wherein the first portion is integral with the end portion.

4. The injector head of claim 3, wherein at least some of the plurality of support pins further includes a second portion, wherein the second portion includes a uniform cross-section, and wherein the second portion extends from the first portion towards the intermediate portion.

5. The injector head of claim 1, wherein the injector body further includes:

a plurality of swirler vanes radially extending between the injector body and the central fuel assembly, each of the plurality of swirler vanes defining a passage therein; and an annular fuel gallery formed in a wall of the injector body and disposed in fluid communication with the passage of each of the plurality of swirler vanes.

6. The injector head of claim 5, wherein the central fuel assembly further includes:

a plenum extending along the central axis and disposed in fluid communication with the passage of each of the plurality of swirler vanes; and a pilot tube extending along the central axis and that is in fluid communication with the plenum.

7. The injector head of claim 6, wherein the pilot tube defines a first opening disposed proximal to the upstream end of the injector body and a second opening disposed proximal to the downstream end of the injector body, wherein the first opening facilitates removal of powder from at least a portion of the central fuel assembly, and wherein the second opening is in fluid communication with the fuel opening of the end portion.

8. The injector head of claim 7, wherein the central fuel assembly further includes a central body concentrically disposed between the injector body and the pilot tube, and wherein a leading edge of each of the plurality of fins extends between the central body and the pilot tube at an angle between 35 degrees and 50 degrees relative to the central axis.

9. The injector head of claim 1, wherein the injector head includes at least one parent material.

10. The injector head of claim 1, wherein at least some of the plurality of support pins have different sizes.

11. The injector head of claim 1, wherein at least some of the plurality of support pins have the same size.

12. The injector head of claim 1, wherein the fuel injector is disposed in a gas turbine engine.

13. A method of manufacturing an injector head for a fuel injector of an engine by additive layer manufacturing, the method comprising:

forming an injector body of the injector head, wherein the injector body extends axially along a central axis and circumferentially about the central axis, and wherein the injector body defines an upstream end and a downstream end;

forming a central fuel assembly of the injector head, the central fuel assembly extending circumferentially about the central axis and concentrically disposed within the injector body;

forming a plurality of fins of a tip portion of the central fuel assembly, wherein the tip portion is disposed proximal to the downstream end of the injector body;

forming an intermediate portion of the tip portion, such that the plurality of fins are integral with the intermediate portion and disposed at a first side of the intermediate portion;

forming a plurality of support pins of the tip portion, such that the plurality of support pins are integral with the intermediate portion and disposed at a second side of the intermediate portion, the second side of the intermediate portion being opposite the first side of the intermediate portion; and forming an end portion of the tip portion, the end portion defining a fuel opening, wherein the end portion is axially spaced apart from the intermediate portion along the central axis, and wherein the plurality of support pins extend between the end portion and the intermediate portion.

14. The method of claim 13, wherein the step of forming the intermediate portion of the tip portion further includes defining a plurality of cooling holes in the intermediate portion and at least some of the plurality of fins.

15. The method of claim 13, wherein the step of forming the plurality of support pins of the tip portion further includes forming a first portion of the each of the plurality of support pins, wherein a cross-section of the first portion of each of the plurality of support pins tapers along the central axis from the end portion towards the intermediate portion, and wherein the first portion is integral with the end portion.

16. The method of claim 15, wherein the step of forming the plurality of support pins of the tip portion further includes forming a second portion of at least some of the plurality of support pins, wherein the second portion includes a uniform cross-section, and wherein the second portion extends from the first portion towards the intermediate portion.

17. The method of claim 13, wherein the step of forming the injector body of the injector head further includes:

forming a plurality of swirler vanes of the injector body, the plurality of swirler vanes radially extending between the injector body and the central fuel assembly, each of the plurality of swirler vanes defining a passage therein; and forming an annular fuel gallery in a wall of the injector body, the annular fuel gallery being disposed in fluid communication with the passage of each of the plurality of swirler vanes.

18. The method of claim 17, wherein the step of forming the central fuel assembly of the injector head further includes:

forming a plenum extending along the central axis and disposed in fluid communication with the passage of each of the plurality of swirler vanes; and forming a pilot tube extending along the central axis and that is in fluid communication with the plenum.

19. The method of claim 18, wherein the pilot tube defines a first opening disposed proximal to the upstream end of the injector body and a second opening disposed proximal to the downstream end of the injector body, wherein the second opening is in fluid communication with the fuel opening of the end portion, and wherein the method further includes removing, via the first opening, residual powder after forming the injector head.

20. The method of claim 19, wherein the central fuel assembly further includes a central body concentrically disposed between the injector body and the pilot tube, and wherein each of the plurality of fins are formed such that a leading edge of each of the plurality of fins extends between the central body and the pilot tube at an angle between 35 degrees and 50 degrees relative to the central axis.

* * * * *